Oct. 12, 1971   M. DAVIS   3,611,799
MULTIPLE CHAMBER EARTH FORMATION FLUID SAMPLER
Filed Oct. 1, 1969
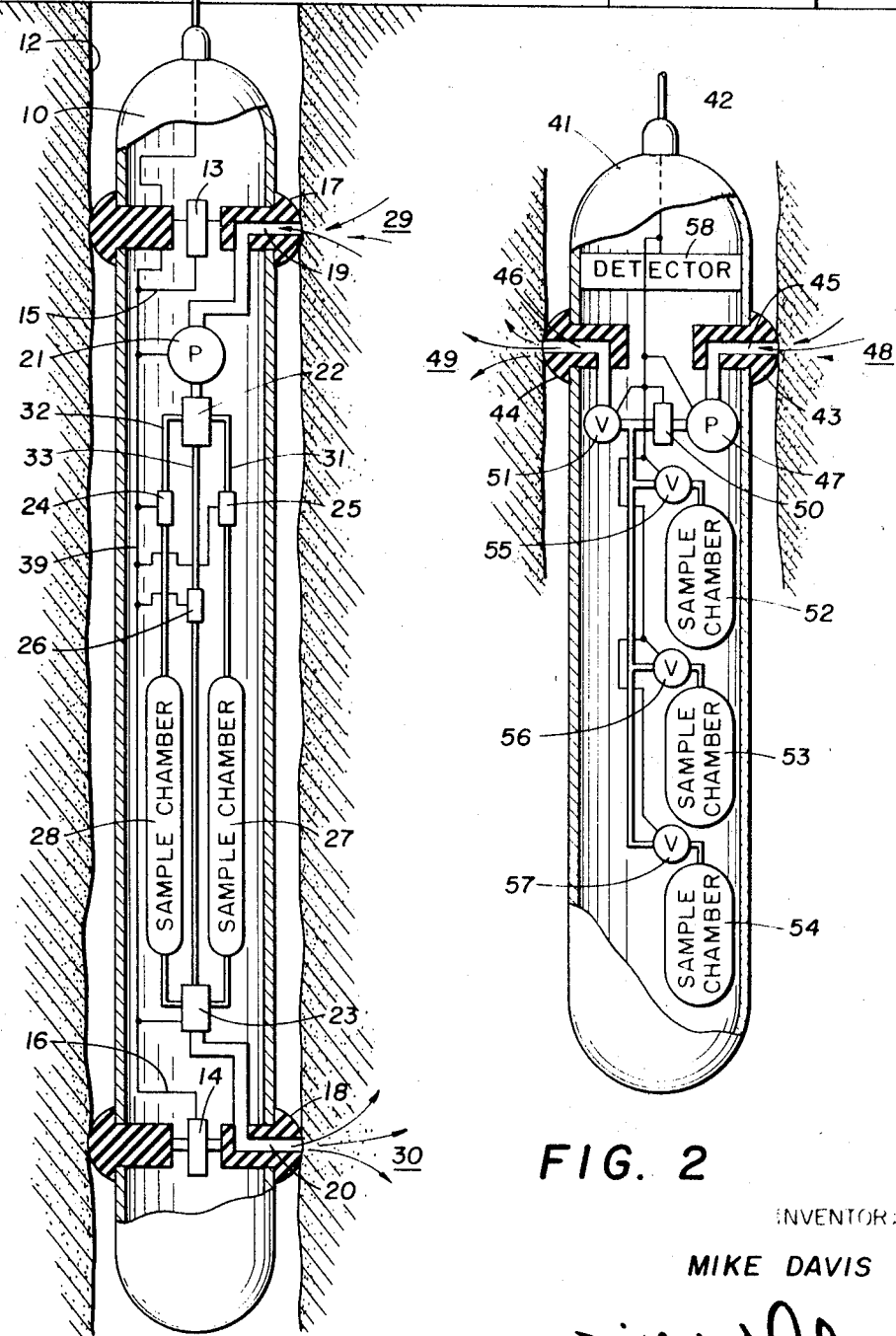
INVENTOR:
MIKE DAVIS
ATTORNEY 3,611,799
MULTIPLE CHAMBER EARTH FORMATION FLUID SAMPLER
Mike Davis, Houston, Tex., assignor to Dresser Industries, Inc., Dallas, Tex.
Filed Oct. 1, 1969, Ser. No. 862,821
Int. Cl. E21b 43/00
U.S. Cl. 73—155                                    10 Claims

ABSTRACT OF THE DISCLOSURE

A multiple chamber sampling system for obtaining fluid samples from earth formations wherein a borehole exploring unit supported for movement through the borehole is provided with spaced means for isolating borehole wall formation portions from borehole fluids. A flow channel selectively interconnects the isolation means and has a pump therein for producing fluid flow from the formation through the flow channel back into the formation. Engaging units contact the formations and fluid therein is pumped from one formation to another or from one portion of a formation to another portion of the same formation. A set of valves controllable from the surface provides means for filling the multiple sampling chambers and transducers provide indications of various physical characteristics of the fluid. Means are provided for determining the exploring units's depth in the borehole.

BACKGROUND OF THE INVENTION

This invention relates to a system for sampling the fluids contained in formations penetrated by a borehole and more particularly to the obtaining of an optimum fluid sample.

Prior art systems have encountered difficulties due to the high intensity of the hydrostatic pressures encountered and the difficulty of transmitting large amounts of energy over a logging cable which imposes limitations on the pumping power available.

Prior art systems are known that inject a fluid into the formation to replace the sample being removed. However, these prior art systems have been limited in the quantity of fluid they could handle and were limited to obtaining a sample from only a single formation. In addition, these prior art systems have not generally been able to obtain a pure sample because the first fluid entering the sampling chamber was usually taken. This fluid is often contaminated. The excessive length of time required to obtain a sample is an additional disadvantage of many of these prior art systems.

If it could be assured that the sample being taken was free from contamination, a much smaller sample would be sufficient for most investigation purposes. The present invention provides a system whereby a selective sample can be obtained with a high degree of assurance that the sample will not be contaminated.

In securing and analyzing samples of formation fluids, it is desirable to be able to sample multiple zones successively without the necessity of removing the apparatus from the borehole following each discrete measurement. The present invention provides a sampling device with a multiplicity of sampling chambers whereby multiple zones can be sampled.

In addition, this invention provides a device whereby various physical characteristics of the subsurface fluids can be monitored and a sample taken of the fluid exhibiting these characteristics.

In addition, this invention provides a device for investigating or treating a particular formation whereby the investigating or treating fluids are stored in a multiplicity of chambers and can be released from the various chambers at will.

By the present invention, there is provided a sampling arrangement for investigation of fluids in formations through which a borehole extends. An exploring unit moveable along the length of the borehole has spaced apart means for isolating spaced borehole wall formation portions from borehole fluids and for establishing fluid flow to or from the respective formation portions when engaged therewith. The portion of formations may be portions of the same formation or portions of different formations. More specifically, structure forming a flow channel having a pump therein interconnects the two isolated formation portions. Valve means controllable from the surface allows the fluid to be directed through one or more of a multiplicity of sample chambers. Means including sensors in the exploring unit sense physical characteristics of the fluid with appropriate indicating means at the surface to monitor the characteristics. When desired, the valves may again be adjusted so as to isolate the portion of the fluid in the sample chamber at that time. Additional samples may be taken by directing the fluid into the other sample chambers in a manner similar to that just explained. The chambers may be filled with fluid for treating or investigating the various formations prior to lowering the exploring unit into the borehole and the valves actuated upon reaching the formations to be treated or investigated.

It is therefore an object of the present invention to provide a device that is capable of obtaining a multiplicity of fluid samples in an earth borehole.

It is a further object of this invention to provide a device capable of obtaining samples from a multiplicity of earth formations in an earth borehole.

It is a further object of this invention to provide a device capable of moving large volumes of formation fluids with a minimum of power.

It is a still further object of this invention to provide a device capable of obtaining formation fluid samples free of contamination.

It is a still further object of this invention to provide a device capable of obtaining a formation fluid sample in response to the observance of an indicated physical characteristic.

It is a still further object of this invention to provide a device for treating and investigating earth formations with treating and investigating fluids.

The above and other objects and advantages will become apparent from a consideration of the following detailed description when taken in conjunction with the accompanying drawing wherein:

FIG. 1 illustrates one embodiment of a fluid sampler according to this invention.

FIG. 2 illustrates another embodiment of the invention wherein fluid is returned to the same formation.

Referring now to FIG. 1, a borehole exploring unit 10 is supported on a cable 11 from the earth's surface for movement through a borehole 12. The unit 10 is thus adapted to be positioned at any point along the length of the borehole 12, at which a measurement may be desired. The unit 10 is supplied with power by way of cable 11 and the control and indicating signals are transmitted via cable 11.

The unit 10 is provided with a pair of formation packing units 13 and 14 that may be activated from the surface to make contact with the formations penetrated by the borehole. The packing units may be any of a variety existing in the prior art. Examples of some of these prior art packing units are shown in U.S. Pats. Nos. 2,904,113, 3,173,485 and 3,289,474. For the purpose of the present disclosure, the units 13 and 14 have been shown in schematic form only. It is to be understood that they are spaced one from the other in order to provide isolation of spaced apart portions of the earth formations through which the borehole 12 extends. It is to be further understood that the units may be operated by control from the earth's surface transmitted along cable 11 and through connections 15 and 16. The units 13 and 14 are equipped with pads 17 and 18 that are urged into contact with the borehole wall. These pads are provided with central flow ports 19 and 20 which are interconnected by intermediate structure to form a complete flow channel. Included in the flow channel is a pumping unit 21; remotely controlled valve units 22 and 23; sensors 24, 25, and 26; and sample chambers 27 and 28. The pumping unit 21 moves the formation fluids from one portion 29 of a subsurface earth formation valve into valve unit 22. From valve unit 22 the fluid may be channelled as desired into sections 31, 32, 33 or any combination of these sections. Sensors 24, 25 and 26 provide an indication of a physical characteristic of the fluid that may be monitored at the surface. The signals from sensors 24, 25, and 26 are transferred to the surface by conductor 39 and cable 11. The fluid continues through sample chambers 27 and 28 into valve unit 23 and exits via port 20 into portion 30 of a subsurface formation. Thus, upon energization of the pump through use of surface control unit 36, the fluid will be drawn from the portion 29 of a subsurface formation communicating with the port 19 through the various intermediate structures and returned to portion 30 of a subsurface formation.

The surface equipment is of conventional form found in the prior art and consists of a drum 37 upon which cable 11 is wound on, or unwound from, in raising and lowering the instrument 10 to traverse the borehole. The signals and power required to operate the subsurface equipment and the signals from the sensors are transferred from cable 11 by slip rings and brushes. Power from supply 40 is applied upon command from control unit 36. The information obtained by instrument 10 may be correlated with depth in the borehole to give an accurate indication of characteristics of the formations and formation fluids surrounding the borehole. One system of accomplishing this is by providing a measuring reel 34 that contacts cable 11. The measuring reel 11 drives a recorder through transmission 35. Another system is illustrated in connection with FIG. 2 and it is to be understood that various systems of correlation may be provided.

The elements are shown diagrammatically, and it is to be understood that the associated circuits and power supplies are provided in a conventional manner. It is also to be understood that the instrument housing 10 will be constructed to withstand the pressures and mechanical and thermal abuses encountered in the borehole.

Because of the practical limits on the energy that is conventionally transmitted into a borehole over a logging cable of extended length, the rate that formation fluids may be forced to flow generally will be relatively low. This is true even though the power requirements are minimized by pumping fluid from formation to formation such that the differential pressure against which the pump 24 must work will be either zero or very small.

In accordance with the present invention, the pumping unit 21 is provided in the flow channel so that the fluid flow from port 19 to port 20 may be continued over an extended period. This has not been possible in prior systems. This permits the flow of an unlimited quantity of formation fluid in order to obtain a desired analysis and further permits the unit 10 to be employed in a single traverse of the borehole 12 for sampling multiple zones along the length of the borehole.

Further, the sensors 24, 25, and 26 may be employed to provide an indication at the surface of the character of the fluid flowing in the channel. More particularly, the system thus provided may employ sensor 24 which by use of the sample chamber 28 may be made pressure-dependent so that the differential pressure across the pump, and thus, between ports 19 and 20 may be recorded at the surface. In such case, the sensor 24 would be a pressure gauge of well-known type which would apply signals to the surface output equipment.

The sensor 26 may be in the form of a flowmeter to provide an indication of the flow rate for a given power level applied to the pumping unit 21. This signal may be integrated to provide a signal representative of volume.

Further, the sensor 25 may be a resistivity cell to measure the electrical character of the fluids. It may be of a type sensitive to changes in viscosity of the fluid or it may be a sensor of well-known type in which the output therefrom is representative of the density of the fluids.

In accordance with this invention, any one or more of the above physical characteristics of the formation fluids may be sensed by the unit 10 with the resultant signal being transmitted to the earth's surface to provide an indication as to the nature of the fluids being extracted from the formation. Other physical characteristics of the fluid may be detected by including appropriate sensors.

The unit 10 may be positioned with the pads 17 and 18 in contact with vertically spaced isolated portions of either a single formation or portions of two formations. The pump 24 is then energized to establish flow of fluids through the input port 19 and out through the exit port 20. The signal from the sensors may then be observed and/or recorded by unit 36. With the character of the fluid in the formation 29 thus evaluated, the unit 10 may then be moved downward to determine the fluid character in the adjacent formation 30 or may be raised to test other adjacent formations. If further investigation and analyzation is desired a sample may be taken and stored in one of the sample chambers.

At such time as the surface signals so indicate, a suitable control signal may be applied from unit 36 to actuate valve units 22 and 23 for the collection of a single sample or a multiplicity of samples. While only two sample chambers and two valves have been shown, it will be appreciated that any number of sample chambers may be employed to collect samples from multiple zones.

Referring now to FIG. 2, another embodiment of this invention is shown wherein the fluid is withdrawn from and returned to the formation at the same level. This embodiment is especially useful when the formation to be investigated is a thin layer with impermeable shale above and below. The means locating the exploring units in the borehole is shown as a means for sensing a physical characteristic of the formations.

The exploring unit 41 is supported on a cable 42 from the earth's surface for movement through a borehole. A pair of formation packing units 43 and 44 are provided that may be urged into contact with the borehole wall. These packing units contain flow ports 45 and 46, which are interconnected by intermediate structure to form a complete flow channel. Located within this flow channel is a pumping unit 47 for moving fluid from one formation portion 48 to another portion 49 of the same formation. A sensor 50 provides an indication of a physical characteristic of the fluid moving through the flow channel. For example the sensor could be a resistivity cell to measure the electrical character of the fluids. A valve unit 51 within the flow channel may be actuated from the surface to direct fluid into the sample chambers 52, 53 or 54. Valve units 55, 56 and 57 may be actuated from the surface to direct the fluid into the various sample chambers.

A detector 58 is located a fixed distance from packing units 43 and 44 to detect a physical property of the formations. The information obtained by this detector may be used to position the exploring unit in the borehole and for providing depth correlation. For example, the detector 56 may be a natural gamma ray detector of a type well known in the art. Other well known detectors for determining a physical property of the formations such as an S.P. electrode could also be used.

The electrical power required by the subsurface units is transmitted along cable 42 and the various connecting conductors. Signals from detector 58 and sensor 50 are transmitted to the surface by cable 42 in a manner well known in the art. The surface equipment may be that shown in conjunction with FIG. 1. The elements are shown diagrammatically, and it is to be understood that the associated circuits and power supplies are provided in a conventional manner.

From the foregoing, it will be seen that a system is provided for investigating fluids where there are spaced apart means for isolating spaced borehole wall formation portions from borehole fluids and for establishing a fluid flow to or from the respective formation portions. The flow channel interconnects the pads. The pumping unit in the flow channel forces fluids through the flow channel. The sensors are employed for sensing physical characteristics of a fluid flowing through the channel. The pumping unit is actuated only when the pads are in contact with the borehole wall. This prevents contamination of the formations with borehole fluids and limits the flow of fluids into the formation to those extracted from the formation.

The system is also useful for injecting investigating fluids into a subsurface earth formation. The investigating fluid may be placed in the sample chambers before the unit is lowered into the borehole. At the desired depth, monitored by the surface equipment, the investigating fluid is released by actuating the valve units. The unit may then be moved to another portion of the formation or to nearby formations to begin taking samples in tracing the migration of the investigating fluid.

In addition, the system is also useful in treating the formation with various treating fluids. The fluids are placed in the chambers and injected into the formations to be treated by actuation of the valve and pumping units.

What is claimed is:

1. An earth formation fluid sampling and investigating device comprising:
   an exploring unit to be lowered into an earth borehole including, inlet means to allow fluid flow from a first formation portion, outlet means to allow fluid to return into a second formation portion, structure forming a flow channel interconnecting said inlet means and outlet means, a pump in said flow channel for producing fluid flow, valve means in said flow channel for selectively diverting fluid flow and sample chamber means connected to said valve means in said flow channel to receive the fluid diverted by said valve means, whereby said fluid can be diverted selectively either to said sample chamber means or to said outlet means.

2. The device of claim 1 including sensor means in said flow channel for sensing a physical characteristic of said fluid.

3. The device of claim 2 including:
   indicating means at the earth's surface connected to said sensors and control means at the earth's surface for actuating said inlet means, pumping means, valve means and outlet means.

4. The device of claim 3 including:
   means for locating the exploring unit in the borehole.

5. The device of claim 4 wherein said means for locating the exploring unit in the borehole includes means for sensing a physical property of the formation.

6. The system of claim 5 including a plurality of sensors and sample chambers, said sample chambers being connected to said valve means in a manner as to be selectively filled by said diverted fluid upon manipulation of said valve means, and said plurality of sensors being connected to said plurality of sample chambers, respectively, whereby each of said sensors is indicative of a given characteristic of the fluid in its related sample chamber.

7. The combination set forth in claim 4 wherein said unit includes a fluid sample chamber, valve means connecting said chamber to said flow channel and means operable from the surface for actuating said valve to direct flow from said channel into said chamber.

8. In a system for investigating fluids in formations penetrated by a borehole, wherein an exploring unit supported for movement through the borehole is provided with speed means for isolating spaced borehole wall formation portions from borehole fluids and for establishing fluid flow to or from the isolated formation portions when engaged therewith, the combination which comprises:
   structure forming a flow channel interconnecting said isolating means,
   a pump in said flow channel for producing flow of fluid from said formation through said flow channel and back into said formation, and
   means including a sensor in said unit for sensing a physical characteristic of the formation fluid during flow thereof through said channel and indicating said characteristic at the surface of the earth.

9. The method of testing formation fluids which comprises:
   isolating spaced portions of the formations exposed along the walls of a borehole,
   establishing continuous flow of fluids from one of said spaced portions into the other of said spaced portions, and
   continuously sensing at least one physical characteristic of said fluids during flow thereof between said portions.

10. The method of claim 9 including the step of diverting said flow of fluids into at least one sample chamber thereby obtaining a sample of the fluid.

References Cited

UNITED STATES PATENTS

| | | | |
|---|---|---|---|
| 2,607,222 | 8/1952 | Lane | 73—155 |
| 3,282,113 | 11/1966 | Sachnik | 73—422 |
| 3,477,277 | 11/1969 | Wostl | 73—53 |

RICHARD C. QUEISSER, Primary Examiner

M. SMOLLAR, Assistant Examiner

U.S. Cl. X.R.

73—153, 425.4; 175—50